United States Patent
Adams et al.

[11] Patent Number: 6,083,343
[45] Date of Patent: Jul. 4, 2000

[54] METHOD OF JOINING STRUCTURAL COMPONENTS OF COMPOSITE MATERIAL

[75] Inventors: Andrew James Adams, Valencia; John David Elvin, Santa Clarita, both of Calif.

[73] Assignee: Lockheed Martin Corporation, Palmdale, Calif.

[21] Appl. No.: 09/055,423

[22] Filed: Apr. 6, 1998

[51] Int. Cl.[7] .......................... B29C 65/00; B29C 65/70
[52] U.S. Cl. .................................. 156/304.2; 156/304.3; 156/304.5; 156/157; 428/57; 428/60
[58] Field of Search ............................ 156/304.3, 304.5, 156/304.2, 304.1, 158, 157; 428/60, 57, 58, 61

[56] References Cited

U.S. PATENT DOCUMENTS

| | | | |
|---|---|---|---|
| 4,015,035 | 3/1977 | Blad et al. | 156/158 X |
| 5,167,742 | 12/1992 | Peters | 156/304.5 X |
| 5,281,454 | 1/1994 | Hanson | 428/57 X |

FOREIGN PATENT DOCUMENTS

| | | | |
|---|---|---|---|
| 902614 | 8/1962 | United Kingdom | 428/60 |
| 1081154 | 8/1967 | United Kingdom | 156/304.3 |

*Primary Examiner*—Jeff H. Aftergut
*Attorney, Agent, or Firm*—Robert A. Schruhl

[57] ABSTRACT

A method for joining together structural components made of composite material using a metal splicing member and for joining together a plurality of structural components to form a high-pressure containment vessel for cryogenic propellants. The method in its broadest sense entails a first step of forming plies from "green" composite material, a second step of arranging first and second stacks of the plies on opposite surfaces of the metal splicing member such that portions of the splicing member are captured between the first and second stacks of the plies, and a third step of curing said stacks of plies so that said composite material is co-bonded with said metal splicing member. The "green" plies and the metal splicing member are then subjected to temperatures and pressures sufficient to effect curing of the plies and attachment to surfaces of the splicing member. A variation of this process is disclosed in which cured plies are used.

8 Claims, 4 Drawing Sheets

METHOD OF JOINING STRUCTURAL COMPONENTS OF COMPOSITE MATERIAL

The invention described herein was made in the performance of work under NASA Contract No. NCC8-115 and is subject to the provisions of Section 305 of the National Aeronautics and Space Act of 1958 (42 U.S.C. 2457).

BACKGROUND OF THE INVENTION

1. Field of the Invention

The present invention relates generally to pressure vessels for cryogenic fuels, and more particularly to a method for joining together structural components comprised of composite material using metal splicing members.

2. Description of the Related Art

Until recently, most pressure vessels were comprised of structures made of metals or metallic compounds. Techniques for securing together segments of such pressure vessels typically involved mechanical devices or bonding material, or a combination of the two. For example, U.S. Pat. No. 5,338,383 to Polackowyj teaches securing an insulation lining to a pressure vessel using mechanical fasteners, such as rivets, pins, clamps and the like, or bonding material, or both. Further, U.S. Pat. No. 2,925,193 to Gibb shows the use of mechanical fasteners to secure together stave elements made of reinforced, synthetic, resin materials Not until recently, however, has the use of non-metallic materials for fabricating pressure vessels been implemented. The development of such new materials was principally occasioned by efforts to find improved ways for exploring space through research directed at discovering of new modes of transportation for high speed space travel, and new fuels or propellants systems, such as cryogenic fuels or propellants. One important discovery has been the versatility of composite material systems, not only for vehicle structures, but also for subsystems in such vehicles.

An area of application for composite material systems, whether or not reinforced, is in fuel containment applications. Composite materials are significantly lighter in weight than metal counterparts, are non-corrosive, and exhibit the same, if not significantly higher, strength. Typically, these tanks are pressurized, and are not depressurized until the propellant has been used up. For use in spacecraft, such tanks must be able to withstand the high internal pressures for long periods of time without leaking. One place where leaks tend to occur in fuel tank applications is in the vicinity of the connection between the tank components, such as at seams or joints.

The minimization of process time for manufacture of such structures is always of high priority. The use of "green" uncured composite materials for pressure vessels permits ease of manipulation of materials, sometimes by hand, to achieve oftentimes very involved configurations. After a shape or contour has been imparted to the green material, curing is generally carried out to obtain rigid, very strong, unitary structures.

Against this background of known technology, the applicants have developed novel methods for joining sections of vessels designed for containment of pressurized cryogenic fuels. Applicants also discovered that, by using these methods for joining vessel sections together, a new and significantly improved fuel containment pressure vessel is obtained.

OBJECTS AND SUMMARY OF THE INVENTION

It is therefore a principal object of the present invention to provide a new process for joining sections of composite material together using a metal splice member, the process of the present invention overcoming many of the disadvantages and drawbacks of previously known processes.

Another object of the invention to provide a novel method for joining together two segments of a fuel tank adapted to hold pressurized cryogenic fuels, where the segments are comprised of composite material and are joined together using a metal splicing member.

Another object of the invention is to provide a process for joining together composite structural segments of a fuel tank adapted to hold cryogenic fuels under pressure to form a sealed, leak-proof, joint.

Still another object is to provide a novel process for joining "green" composite members using a metal splicing element to form a leak-proof seal, wherein the joining is achieved by curing the composite members.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since only the generic principles of the present invention have been defined herein specifically to provide teachings for a novel air vehicle that encompasses many long sought after features that make high speed flight more easily attainable.

Figure 1:
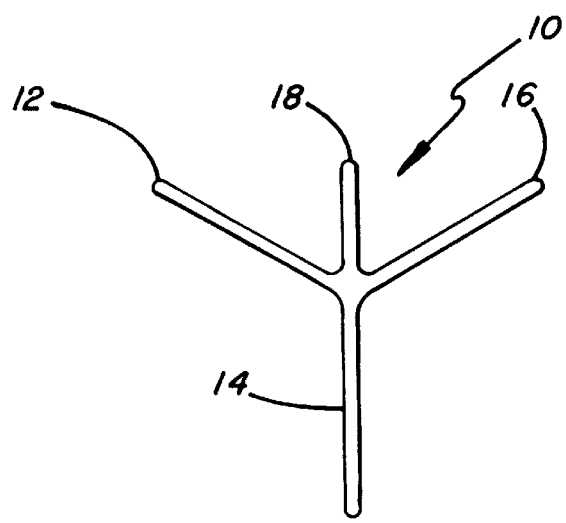
FIG. 1 is a cross-sectional view of a preferred embodiment of the splicing element used to join composite structures together in accordance with the teachings of the present invention.
Figure 2:
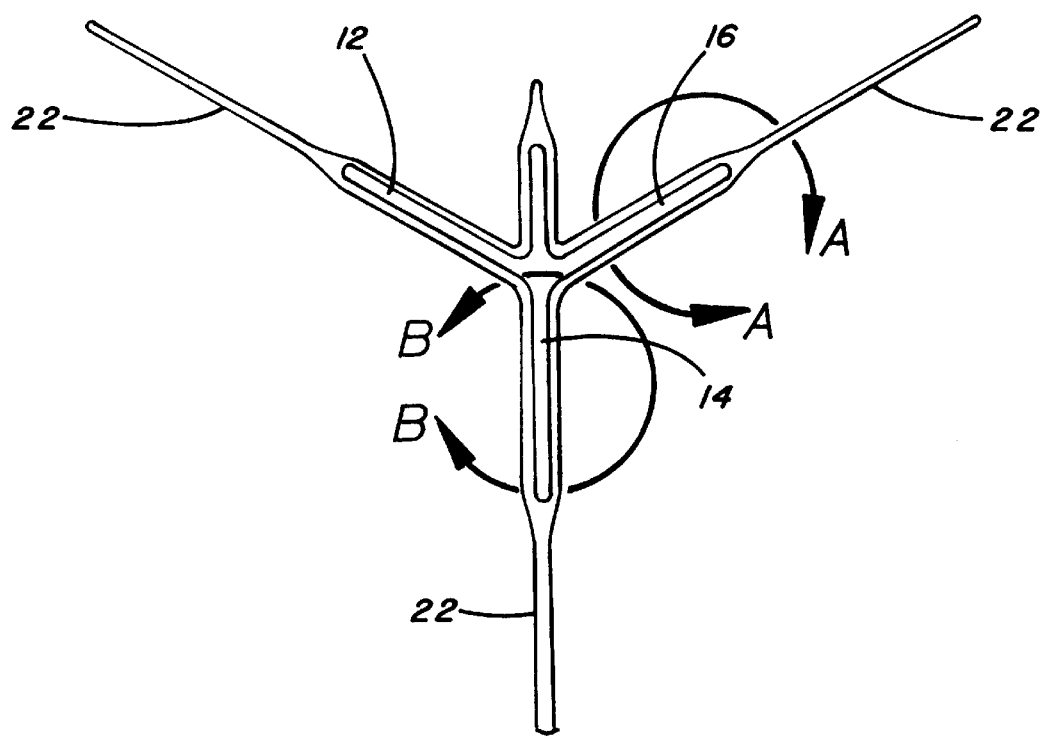
FIG. 2 depicts the splicing element of FIG. 1 connected with several composite components.

Referring now to FIGS. 1 and 2, the splicing element or member 10 of the present invention includes first, second and third "legs" 12, 14, 16, which are arranged at approximately 120° relative to one another. The preferable configuration of splicing member 10 is a substantially "Y"-shape, but it is conceivable that other overall configurations will be useful.

Disposed directly opposite to, and substantially co-linear with, the second leg 14 is a short, secondary leg 18. Preferably, the splicing member comprises an Invar insert which is joined to composite elements (shown at "22" in FIG. 2). Elements 22 typically take the form of plate or sheet elements, both planar and curvilinear.

Figure 3:
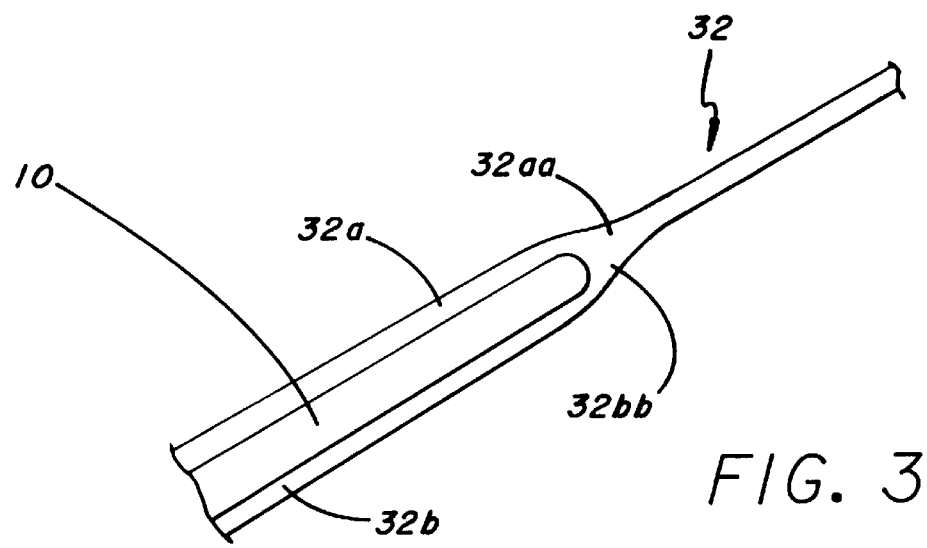
FIG. 3 is an enlarged view of region A—A shown in FIG. 2.
Figure 4:
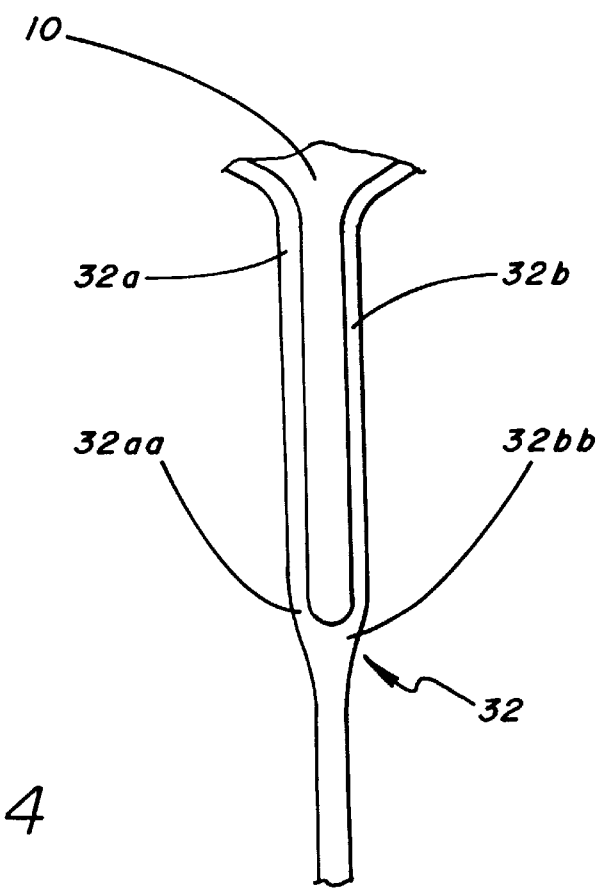
FIG. 4 is an enlarged view of region B—B shown in FIG. 2.

FIGS. 3 and 4 show two regions designated as Region A and Region B in FIG. 2, illustrating in enlarged views the arrangement of the splicing member relative to the composite elements at each of these representative locations. Each composite element is comprised of layers, or "plies", of composite material, such as is well known in this art. The plies are preferably deposited or laid on top of each other for the purpose of building up stacks of predetermined configurations. Each ply typically has specific properties associated with it. The properties accrue not only from the material of which the plies are comprised, but also from the reinforcing fibers used in the plies and the relative orientations of the plies or the direction of the fibers in the respective plies. Thus, by placing or orienting adjacent plies at angles to one another, one can alter the properties of the built-up structure. Similarly, by choosing the angles at which reinforcing fibers are disposed in the adjacent plies, it is possible to alter the structural characteristics and properties of the resulting structures.

FIGS. 3 and 4 illustrate the disposition of plies at the regions designated "A" and "B" shown in FIG. 2. In region "A" seen in FIG. 3, the plies 32 of the composite structural components are separated to define elongated stack members 32a and 32b for seating against opposing upper and lower surfaces, respectively, of one leg of the splicing member 10. The pair of stack members 32a and 32b effectively capture the splicing member leg between them. Preferably, these elongated stack members 32a, 32b are tapered at their free ends 32aa, 32bb to form a smooth junction with the respective surfaces of the splicing member leg against which they are disposed.

Typically, in forming the stack members 32a, 32b, a first "inner" ply will be disposed against the splicing member leg. Successively placed plies are of shorter length and are sequentially laid on top of the inner ply. In so doing, an overall, tapered, thickness is built up. A layer of adhesive, such as AF-191, is applied to the upper and lower surfaces of the splicing member leg before the first "inner" ply is positioned against those surfaces. Region "B" shown in FIG. 4 depicts substantially the same construction as that shown in FIG. 3.

Figure 5:
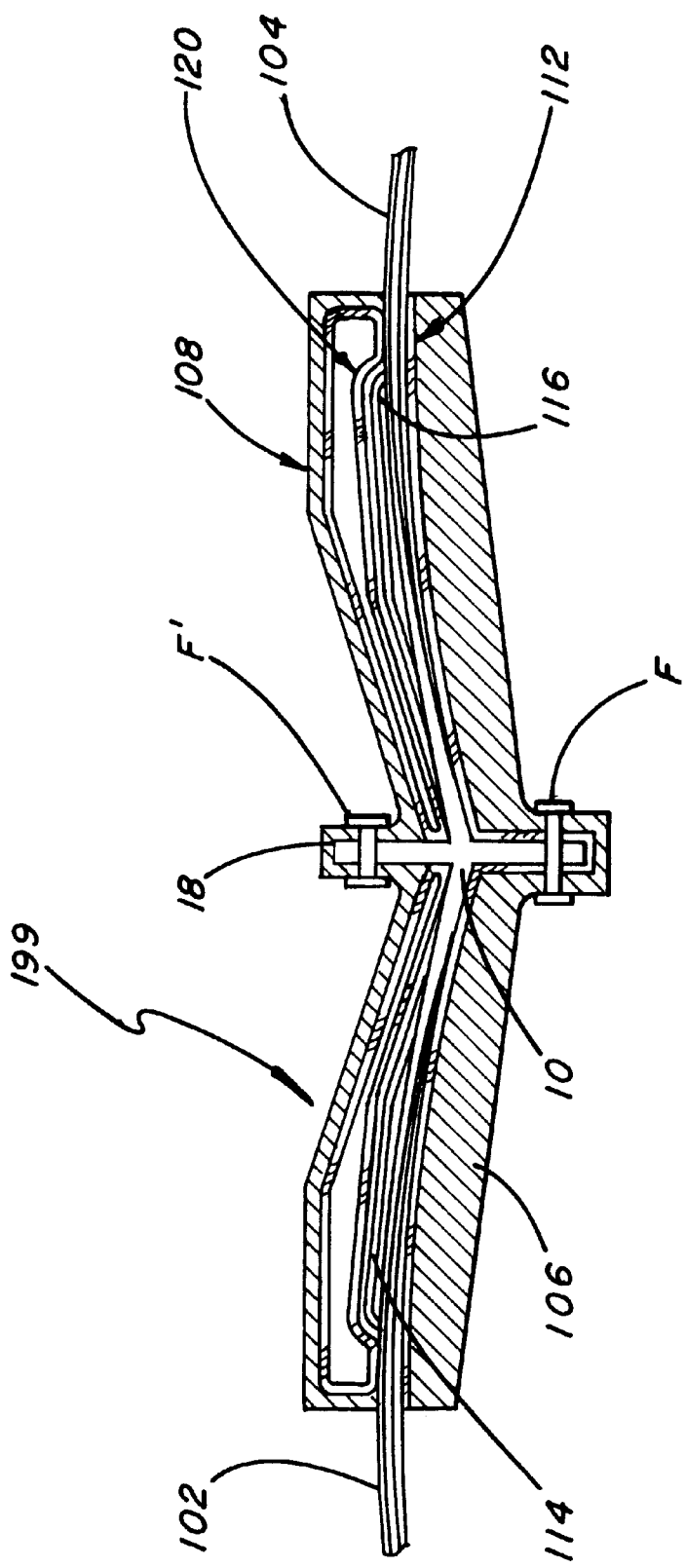
FIG. 5 shows a fixture that can be used in implementing the method of the present invention.

FIG. 5 shows a fixture 199 useful in securing the splicing member 10 to pre-cured composite sheet or plate members 102, 104 for an out of autoclave curing process. The fixture includes a fixed, rigid, base portion 106 upon an upper surface of which a layer 112 of compliant silicone interfacing material is deposited. Plies of "green" composite material are positioned atop the interfacing material to form stacks 114 and 116. The end of each stack located adjacent to the splicing member 10 is divided into upper and lower portions against which the splicing member legs 12 and 14 are positioned. The lower leg 14 of the splicing member 10 is next secured to the base portion 106 of the fixture with a mechanical fastener, such as that shown at F. An inflatable bladder 120 of the type normally used in curing techniques in this art is positioned over the upper portions of the stacks. A top portion 108 of the fixture is placed over the entire array of stacks, splicing member legs and bladder, and secured to the lower portion of the fixture with a fastener F' attached to the leg 18 of the splicing member 10. At this point, the entire assembly can either A) be placed inside an oven which provides the heat portion of the curing process or B) heating blankets can be incorporated into the "pressure tool", i.e., replace the compliant interfacing material with a heating blanket. The heat from either A) or B) is sufficiently high enough to effect curing, and at the same time, pressure is applied to the bladder inside the fixture so that the stacks can be pressed to the metal surfaces during the curing process. The divided stack of plies serve to provide a pair of members between which a respective leg of the splicing member 10 can be captured and secured.

Figure 6:
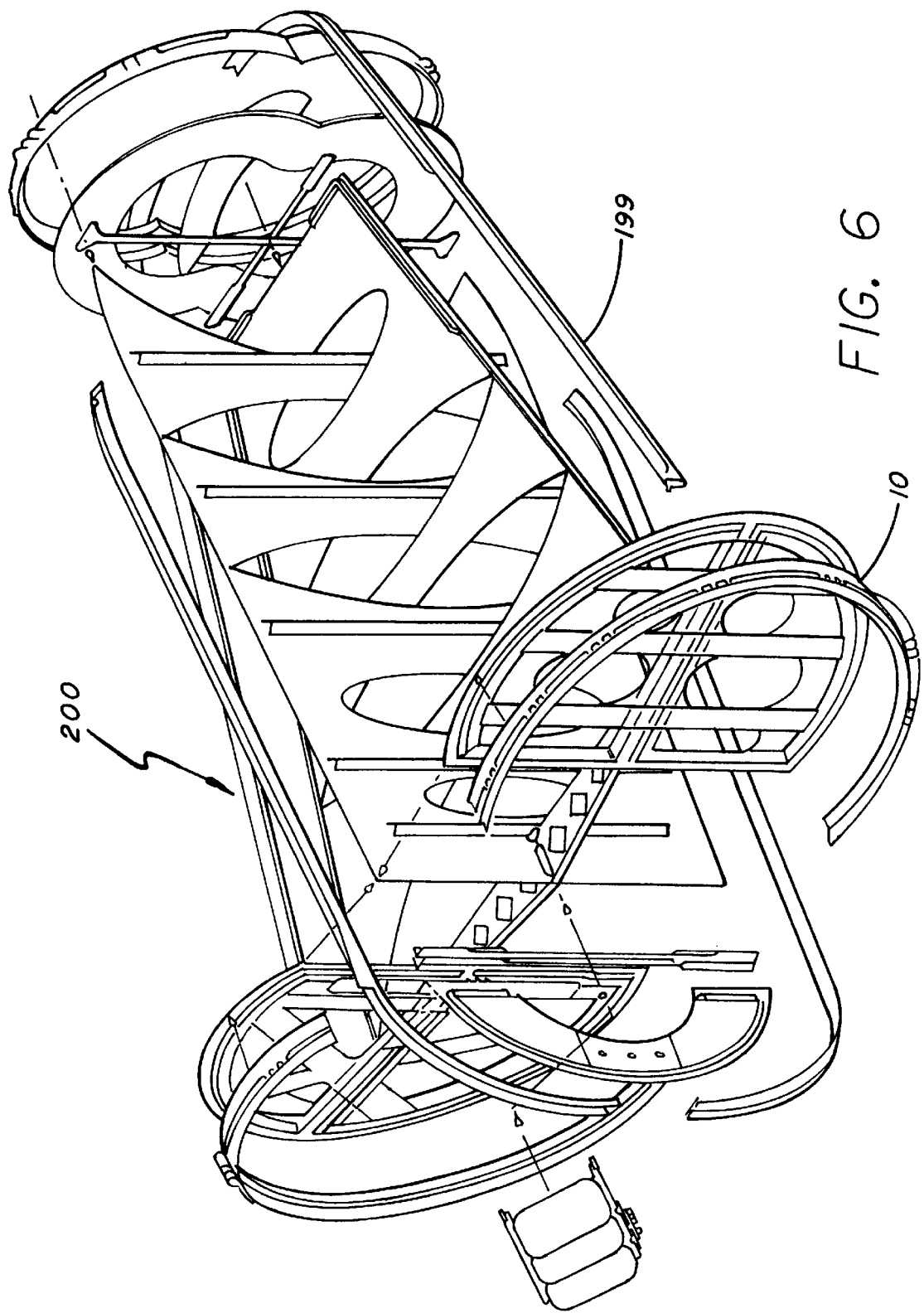
FIG. 6 shows an exploded view of a fuel containment vessel in which the present invention is orientationally shown in multiple configurations.

FIG. 6 shows a perspective orientation of splicing element 10 as it is applied or incorporated into a fuel containment vessel or tank 200. Multiple configurations of the present invention are possible, shown herein are annular as well as elongated applications.

Where the composite sheet or plate members 102 and 104 are not already cured the fixture in FIG. 5 is not used. The stack-up shown in FIG. 2 is place in an autoclave and subjected to sufficiently high enough temperatures to effect curing so that the stacks can be pressed to the metal surfaces during the curing process. The result of either process is the co-curing of metal splicing member(s) 10 and the composite structural components. It is contemplated that a plurality of structural components can be joined together to form an enclosure or containment vessel which is used to store cryogenic propellants. Such vessels will be pressurized to insure the conveyance of the propellants to points of use or consumption. The co-curing of the composite material with the metal splicing members will ensure a leak-proof joint between the structural components of which the containment vessel is comprised.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What we claim is:

1. A method for joining structural components made from composite material using a metal splicing member, comprising:

providing plies of said composite material, arranging first and second stacks of said plies on opposite surfaces of said metal splicing member, said splicing member is "Y" shaped, such that portions of the splicing member are captured between the first and second members stacks of plies, subjecting said first and second stacks of plies arranged about said metal splicing member to heat and pressure of an amount that is great enough to cause said composite material to bond with said metal splicing member.

2. The method of claim 1, wherein said splicing member has a central body portion and lateral arms extending from the body portion, said stacks of plies arc arranged on opposite surfaces of said arms.

3. The method of claim 2, wherein said step of arranging said stacks of plies on said opposite surfaces of said alms including the step of forming taper at end regions of said stacks.

4. The method of claim 1, wherein said plies are "green", uncured, composite material, and said step of subjecting said stacks of plies to heat and pressure includes regulating said heat and pressure to insure that leak paths are avoided at said bond between said composite material and said metal splicing member.

5. The method of claim 4, wherein said stacks are subjected to heat and pressure in an autoclave.

6. The method of claim 1, wherein said step of arranging first and second stacks of said plies on opposite surfaces of the metal splicing member comprises depositing successively shorter length plies on said surfaces to form tapered edges adjacent said metal splicing member.

7. The method of claim 6, and including the further step of enclosing said stacks of composite material and metal splicing member in a fixture containing an inflatable bladder, and inflating said bladder during the curing step to insure bonding pressure is applied to the "green" plies of composite material.

8. The method of claim 7, and including the further step of joining a plurality of said structural components and said splicing members to form a pressurizable containment vessel for a cryogenic propellant.

* * * * *